(12) United States Patent
Coffy et al.

(10) Patent No.: US 6,915,281 B2
(45) Date of Patent: Jul. 5, 2005

(54) SYSTEMS AND METHODS USING A DIGITAL PEN FOR FUNDS ACCOUNTING DEVICES AND POSTAGE METERS

(75) Inventors: Jean-Hiram Coffy, Norwalk, CT (US);
Arthur J. Parkos, Southbury, CT (US);
Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 48 days.

(21) Appl. No.: 10/065,336

(22) Filed: Oct. 4, 2002

(65) Prior Publication Data

US 2004/0002926 A1 Jan. 1, 2004

Related U.S. Application Data

(60) Provisional application No. 60/319,371, filed on Jun. 30, 2002.

(51) Int. Cl.$^7$ .............................................. G06F 17/60
(52) U.S. Cl. ........................ 705/410; 705/1; 705/404; 705/18; 705/44
(58) Field of Search ..................... 382/101; 705/404, 705/1, 402, 408, 410, 18, 44

(56) References Cited

U.S. PATENT DOCUMENTS

| | | | | |
|---|---|---|---|---|
| 5,453,762 | A | | 9/1995 | Ito et al. ..................... 345/179 |
| 5,612,720 | A | | 3/1997 | Ito et al. ..................... 345/179 |
| 5,612,889 | A | * | 3/1997 | Pintsov et al. ............... 700/226 |
| 6,201,903 | B1 | * | 3/2001 | Wolff et al. ................. 382/317 |
| 6,208,771 | B1 | | 3/2001 | Jared et al. ................. 382/306 |
| 6,275,745 | B1 | * | 8/2001 | Critelli et al. .............. 700/227 |
| 6,285,916 | B1 | * | 9/2001 | Kadaba et al. .............. 700/222 |
| 6,310,988 | B1 | | 10/2001 | Flores et al. ................ 382/313 |
| 6,311,042 | B1 | * | 10/2001 | DeSchrijver ............... 455/66.1 |
| 6,327,395 | B1 | | 12/2001 | Hecht et al. ................ 382/306 |
| 6,396,598 | B1 | | 5/2002 | Kashiwagi et al. ......... 358/474 |
| 6,502,756 | B1 | | 1/2003 | Fahraeus .................... 235/494 |
| 6,548,768 | B1 | | 4/2003 | Pettersson et al. ......... 178/18.01 |
| 6,570,104 | B1 | | 5/2003 | Ericson et al. ............. 178/18.09 |
| 6,573,887 | B1 | | 6/2003 | O'Donnell, Jr. ............ 345/179 |

(Continued)

FOREIGN PATENT DOCUMENTS

| | | |
|---|---|---|
| JP | 2001-43000 A | 2/2001 |
| JP | 2001-43000 A * | 2/2001 |

OTHER PUBLICATIONS

Unknown Author, "Paper at the Cutting Edge:", Oct. 2004, Financial Times, London 2d1 20041023w111.007 ed, p11.*
Unknown Author, "Anoto, Subsidiary of C technologies, Initiates Collaboration with John Dickinson, UK's Leading Producer of Stationary Products", Apr. 23, 2001, Business Wire, 2 pages.*
Anoto Advertising Booklet—"Uniting Handwriting with the Digital World", undated, 15 pages.
Anoto Advertising Booklet—"Hey, Guess What those Nifty Swedes Have Dreamed Up Now to Revolutionize Digital Communication?!", undated, 22 pages.
"A Comparison of Anoto Technology with Other Releeant Systems," Undated. 17 pages.
Anoto functionality—World Wide Web pages from www.anotofunctionality.com. Accessed Jan. 29, 2004. 7 pages.
Unknown Anoto, Subsidiary of C Technologies, Initiates Collaboration with John Dickinson, UK's Leading Producer of Stationary Products, Apr. 23, 2001, Business Wire, 2 pages.

Primary Examiner—John G. Weiss
Assistant Examiner—Richard Woo
(74) Attorney, Agent, or Firm—Angelo N. Chaclas; Charles R. Malandra; George M. Macdonald

(57) ABSTRACT

A method and system for processing postage payments is described. In one configuration a digital pen is utilized to provide a mail piece identifier. The data provided is utilized to account for postage and verify payment of postage.

20 Claims, 5 Drawing Sheets

U.S. PATENT DOCUMENTS

| | | | |
|---|---|---|---|
| 6,577,300 B2 * | 6/2003 | Picoult et al. | 345/179 |
| 6,586,688 B2 | 7/2003 | Wiebe | 178/18.09 |
| 6,594,406 B1 | 7/2003 | Hecht | 382/306 |
| 6,609,653 B1 | 8/2003 | Lapstun et al. | 235/375 |
| 6,627,870 B1 | 9/2003 | Lapstun et al. | 250/221 |
| 6,681,045 B1 | 1/2004 | Lapstun et al. | 382/187 |
| 2001/0055411 | 12/2001 | Black | 282/124 |
| 2002/0035687 * | 3/2002 | Skantze | 713/168 |
| 2002/0057824 * | 5/2002 | Andreasson | 382/101 |
| 2002/0107885 | 8/2002 | Brooks et al. | 707/505 |
| 2002/0126105 * | 9/2002 | O'Donnell, Jr. | 345/179 |
| 2002/0193975 | 12/2002 | Zimmerman | 703/6 |
| 2003/0001020 | 1/2003 | Kardach | 235/494 |
| 2003/0046256 * | 3/2003 | Hugosson et al. | 707/1 |
| 2003/0133629 | 7/2003 | Sayers | 382/313 |

* cited by examiner

SYSTEMS AND METHODS USING A DIGITAL PEN FOR FUNDS ACCOUNTING DEVICES AND POSTAGE METERS

CROSS REFERENCE TO RELATED APPLICATIONS

This application claims priority under 35 U.S.C. section 119(e) from Provisional Patent Application Ser. No. 60/319,371, filed Jun. 30, 2002, entitled Systems and Methods Using a Digital Pen for Funds Accounting Devices and Postage Meters, which is incorporated herein by reference in its entirety.

BACKGROUND OF INVENTION

The illustrative embodiments disclosed in the present application are useful in systems including those for providing funds accounting devices and more particularly are useful in systems including those for providing for accounting of postage and evidence of postage.

Funds accounting, storing and dispensing systems are potential targets for fraud as they store funds. Certain funds systems are regulated and required to exhibit some level of security capability to attempt to prevent or dissuade fraudulent activity and to provide some forensic evidence to assist in tracking any fraud that is perpetuated.

For example, postage meters approved by the United States Postal Service (USPS) must exhibit certain security capabilities in order to be approved for use. Many postage meters in the United States provide funds accounting such that a source of funds is debited when postage is prepaid before being placed into the mail stream. Additionally, many postage meters provide proof of the postage payment in the form of printed indicia placed on the mail piece, typically on the upper right hand corner of an envelope. In a postage system that utilizes prepaid funds such as the USPS, a postage meter may account for funds by providing an ascending register to track money spent, a descending register to keep track of available funds and a piece count register to track total number of mail pieces franked. Certain other postal systems utilize post-paid postage wherein a postage meter may incorporate credit accounting features.

Certain mailing machines incorporate a funds-accounting device such as a vault or postal security device and an indicia-printing device into one mechanical enclosure having some security features to deter tampering.

Mailing machines including postage meters are commercially available from Pitney Bowes Inc. of Stamford, Conn.

SUMMARY OF INVENTION

The present application describes systems and methods for providing a postage verification system.

DETAILED DESCRIPTION

Postage meters may be characterized as operating in an open meter manner or a closed meter manner. A typical closed system postage meter includes a dedicated printer for printing evidence of postage used. A typical open system meter may utilize a general-purpose printer. Postal funds are often stored in a postal security device (PSD) that may employ a secure accounting vault.

For example, a reference directed toward a Network Open Metering System is described in U.S. Pat. No. 6,151,590, issued Nov. 21, 2000 and incorporated herein by reference. A reference directed toward a Postage Metering System and Method for a Closed System Network is described in U.S. Pat. No. 6,081,795, issued Jun. 27, 2000 and incorporated herein by reference. A reference directed toward a Postage Metering System and Method for Single Vault Dispensing Postage to a Plurality of Printers, is described in U.S. Pat. No. 6,202,057, issued Mar. 13,2001 and incorporated herein by reference. A reference directed toward Hidden Information on a Mail Piece for Authentication, is described in U.S. Pat. No. 6,390,377, issued May 21, 2002 and incorporated herein by reference.

For example, a reference directed toward a System and Method for Managing Multiple Users With Different Privileges in an Open Metering System is described in U.S. Pat. No. 5,742,683, issued Apr. 21, 1998 and incorporated herein by reference. A reference directed toward an Electronic Postage Meter System is described in U.S. Pat. No. 6,050,486, issued Apr. 18, 2000 and incorporated herein by reference. A reference directed toward Multiple Registered Postage Meters is described in U.S. Pat. No. 6,061,670, issued May 9, 2000 and incorporated herein by reference.

A reference directed toward Recording and Input to a Programmable Stamp is described in commonly owned, co-pending U.S. patent application Ser. No. 09/833,167, filed on Apr. 11, 2001 and incorporated herein by reference.

A reference directed toward A Mail Processing System With Unique Mailpiece Authorization is described in U.S. Pat. No. 5,612,889, issued on Mar. 18, 1997 and incorporated herein by reference.

Figure 1:
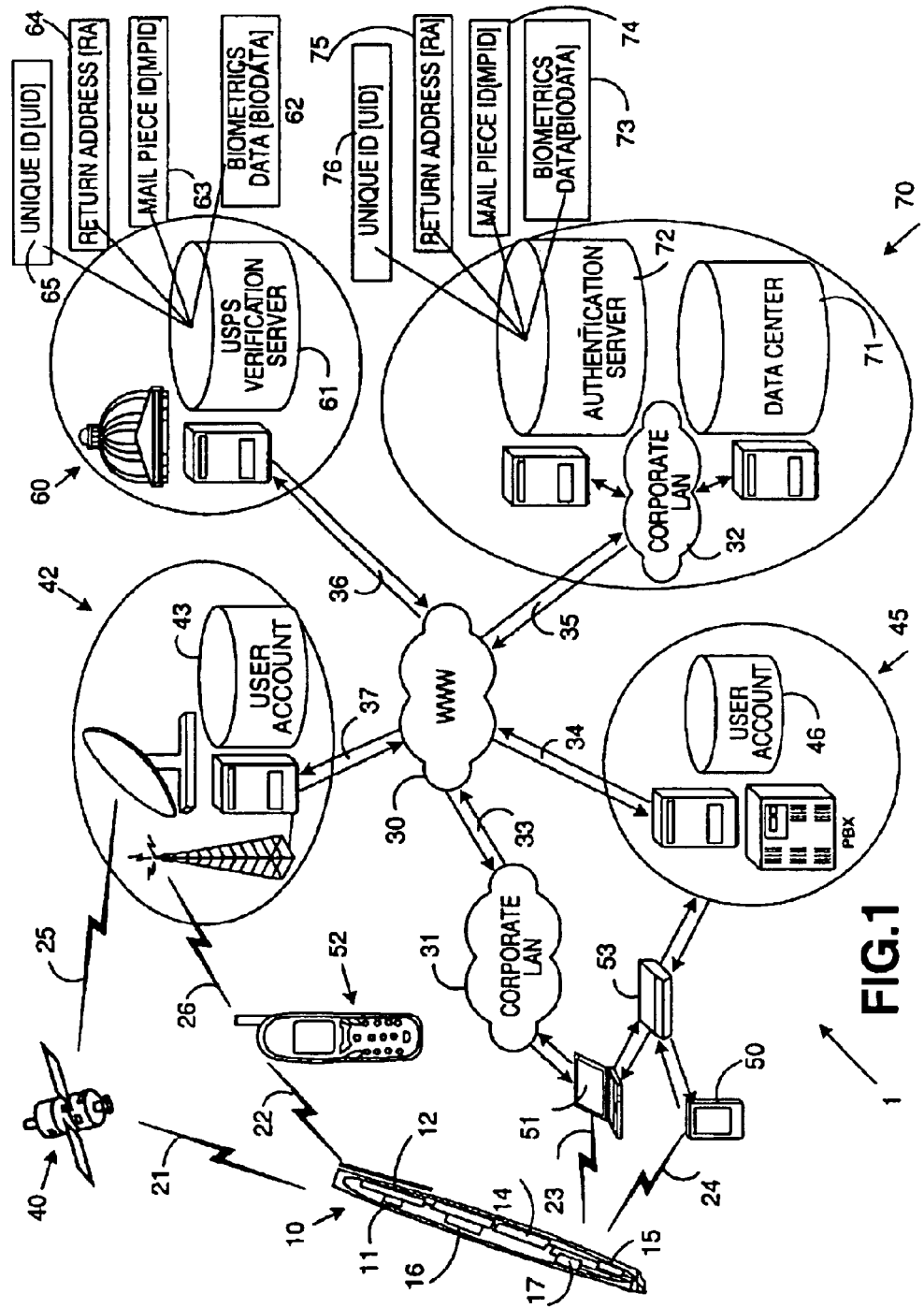
FIG. 1 is a schematic representation of a postal service information system according to an illustrative embodiment of the present application.

Referring to FIG. 1, a first illustrative embodiment describing a postage payment evidencing system is shown.

Handheld processor 50 is a PDA including a docking cradle for access to a local computer or network. Alternatively, the docking connection is wireless.

There may be a desire to know the position of the pen 10 that is acting as a meter. While GPS system 40 may provide some tracking information when the signal is available, the signal is not always available. The pen 10 could be tracked using an IP address located with a particular location. Furthermore, several cell phone 911 positioning systems are developed that could be used in identifying the position of a processor that is paired or otherwise linked to the pen 10. For example, cellular telephone 52 may be paired with pen 10 using Bluetooth such that they are co-located. The cellular telephone could then be used to determine position by triangulation or other method such as a 911 positioning system.

In an alternative embodiment, a satellite system such as the GPS system is utilized as an alternative communications path.

In this example, wireless communications channels using Bluetooth are provided for communications links 22, 23 and 24. One or more of the available cellular telephone communications channels are utilized for connection 26. Furthermore, satellite communications systems such as GPS receivers and other satellite systems are utilized for connections 21 and 25.

Cellular telephone 52 is connected to cellular operator system 42. The cellular telephone could simply provide a data link such as a GSM link. In an alternative, the cellular telephone could include additional processing capacity and be used to capture and/or manipulate data. Cellular operator 42 has communications facilities and user account processing and storage facilities 43. The cellular operator 42 systems are connected to the Internet 30 using T1 line 37.

The telephone company 45 includes a user account database 46 and a connection to the Internet 30 using T1 line 34. Additionally, telephone connections (not shown) connect to the switch.

Corporate LAN 31 is connected to Laptop 51 utilizing a network such as an Ethernet network connection 51. Additionally, laptop 51 is connected to a modem 53 for connection to the telephone company systems.

Postal Authority 60 includes a connection to the Internet 30 using a T1 line 36. Alternatively, the connections to the Postal Authority 60 could be over private lines or may be a Virtual Private Network. It is contemplated that all of the connections utilize appropriate security measures. Here, the Postal Authority is the USPS. USPS Verification Server (USPSVS) 61 stores user data including biometric data BIODATA 62. The server 61 also stores mail piece Identifiers (MPID) 63 and Return Address (RA) information 64 that may be used to select a client ID. The server 61 also stores Unique ID data (UID) 65.

Meter Data Center 70 may be operated by a Postal Authority or a third party. Here, Meter Data Center 70 includes a data center 71 and authentication server 72. The servers are connected to a corporate LAN 32 that is preferably a production environment dedicated to servicing meters. Corporate LAN 32 is connected to the Internet 30 using T1 line 35. Alternatively, the connections to the meter data center 70 could be over private lines or may be a Virtual Private Network. It is contemplated that all of the connections utilize appropriate security measures. Authentication Server (AS) 72 stores user data including biometric data BIODATA 73. The server 72 also stores mail piece Identifiers (MPID) 74 and Return Address (RA) information 75 that may be used to select a client ID. The server 72 also stores Unique ID data (UID) 76.

Laptop 51 utilizes a mobile Pentium 4 processor. The server processors are geographically and load balanced application servers using systems available from Sun Microsystems and the storage servers use multiple location redundant backup systems.

Additionally, other appropriate wireless and wired networks and connections may be utilized. It is contemplated that other communications channels such as OC-3 lines or wireless connections could be used in place of the T1 lines. Similarly, the other communications channels could be replaced with alternatives. As can be appreciated, various communication flows may be utilized, some of which will be chattier than others. Laptop 51 could provide gateway access to the TCP/IP Internet network.

Here, it is contemplated that different portable processors may be utilized in the system. Accordingly, the machines or user interface servers utilize the capabilities of the portable processor to determine what user interface logic to present to a user and whether additional biometric information is available. Additionally, user preferences could be utilized to pre-configure the user interface and the user may be allowed to store personal macros for each type of machine that is to be operated.

Additional systems compliant with hardware layer protocols such as the versions of the IEEE 802.11 are available as well as systems such as Wi-Fi compliant systems. Typical wired network interface cards (NIC) utilize the Ethernet protocol in which each individual Ethernet card produced is assigned a unique address. An address issuing authority ensures that the addresses assigned to the various manufacturers are unique. Bluetooth™ systems do not generally require user intervention to connect to the Personal Area Network access point.

Pen 10 includes a processor 14, memory 12, ink 17, a camera or image sensor 15, a battery 16 and a Bluetooth transceiver 11. It also includes biometric sensors (not shown). In an alternative, the ink is machine detectable. In another embodiment, the ink is invisible.

Wireless systems such as 802.11b sometimes utilize WEP encryption to encrypt packets as they are sent over the open airways and subject to snooping. Such WEP techniques may not provide adequate protection of the underlying data. Bluetooth™ utilizes several layers of security. At a link level, remote/local device authentication is required before any communication can take place. This system may be subject to identity or pin attacks. At the Channel level, a link level connection occurs and then the devices need to authenticate before an communications channel is established. Finally, there is optional Bluetooth™ encryption of the data payload being transmitted.

In this embodiment, appropriate security at several protocol layers is utilized including the application layer.

The embodiments described herein may utilize biometric data for purposes such as authentication of a user. In this embodiment, the digital pen 10 is a digital pen available from Anoto, Inc. The pen 10 provides biometric data relating to the pen strokes used including hand speed, pen tip pressure and the inclination angle between pen and paper. Such data is referred to herein as BIODATA. In alternative embodiments, the BIODATA may include other biometric data such as a retinal scan or fingerprint scan performed using an external processor such as laptop 51 that is co-located with the pen or by the pen 10. In certain embodiments herein, the name and return address of a user is defined as Name and Return Address (NRA). The pen 10 is assigned a unique identification code that is a unique serial number for the pen. In an alternative, the PUID is a Bluetooth™ MAC code or other unique or group assigned code including a post office supplied meter identification code. An electronic signature card (ESC) is defined in this embodiment as a secure hash of the UID, NRA and BIODATA. An e-Receipt is defined as an electronic receipt that is a secure hash of the MPID and ESC.

The system of this embodiment provides security by having biometrics data about the owner/user sent to the AS in real time every time the pen is used, thereby reducing the possibility of fraud. It can also provide value added services such as email notification to sender, tracking and proof of sender's identify for non-repudiation and other purposes such as mail security.

Figure 2:
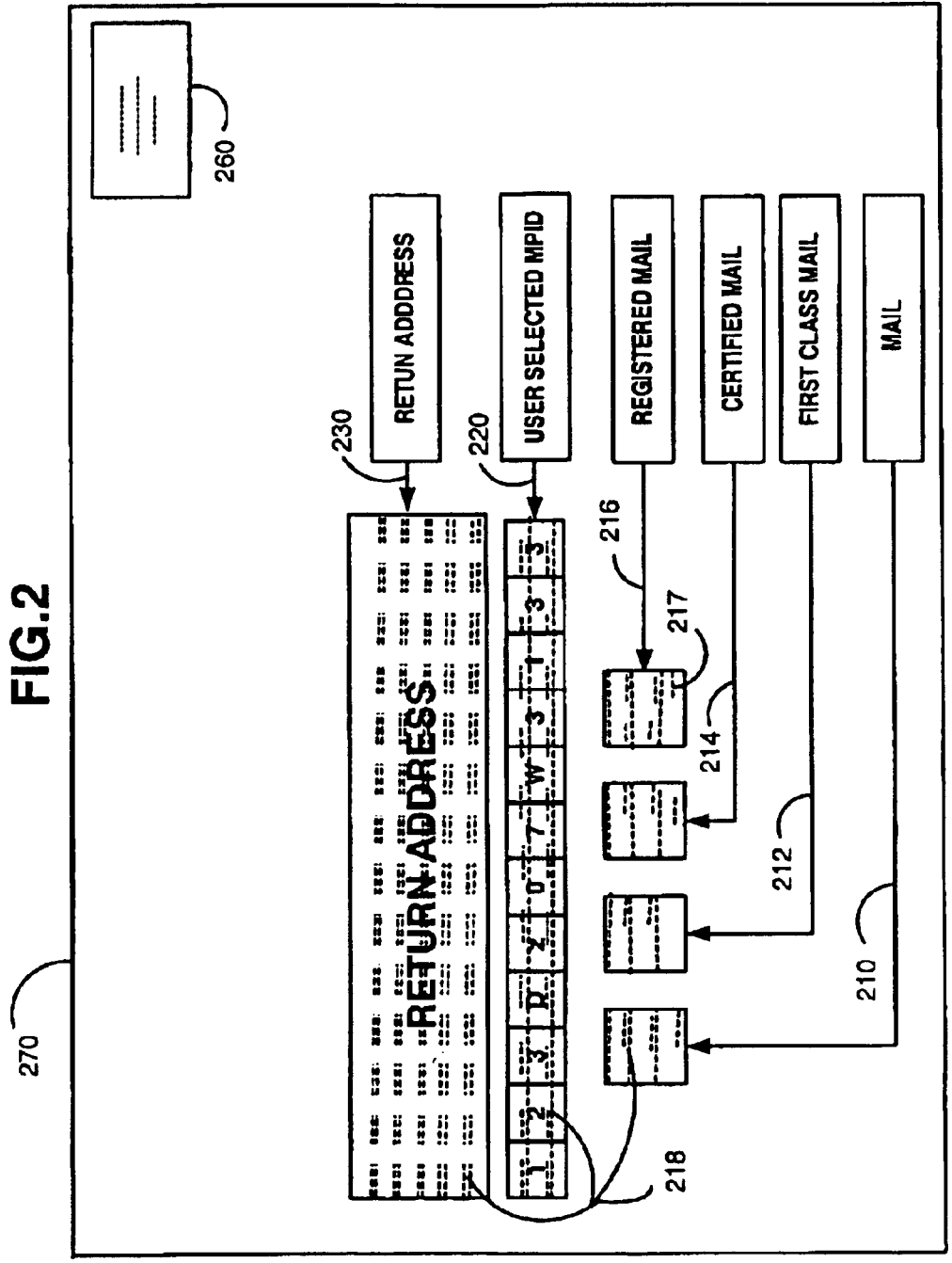
FIG. 2 is a schematic representation of a portion of a media for evidencing postage payment according to an illustrative embodiment of the present application.

Referring to FIG. 2, a schematic representation of a portion of a media for providing data used in accounting for postage is shown. In this embodiment, an envelope 270 has certain defined areas for data input that is used by a digital metering system 1 for postage accounting. Here, an envelope 270 is a plain paper envelope that has preprinted on it embedded intelligence that can be read by the pen and sent to the Authentication Server 72 for further processing. In this illustrative embodiment, the intelligence is in the form of a pattern 218 that is either pre-printed on the envelope or printed by any laser printer capable of printing it.

The pattern 218 is available from Anoto Inc. and is used such that the grid uniquely defines 2 dimensional portions of an enormous 2-dimensional map. Accordingly, the abstract grid location could be assigned many meanings including a map to a relative or absolute position on a media such as an envelope and also for a user selection such as a choice to use first class mail. The pattern portions are used in the data fields 210, 212, 214, 216, 220 and 230 in order to allow the pen processor or remote pen data processor to know where on the pattern the pen is located. Alternatively the pattern 218 may be printed on an adhesive back label that may be peeled off and applied to the mail piece as need be.

For example, a user could place a mark using the digital pen 10 in box 210 to select regular mail processing. The user would then see the ink marking in the box, and the digital pen processor 14 would transmit that data to an external processor to indicate the selection. That selection indication could also be used to launch an application program or portion of software code to process the image data associated with the pen strokes. Here, the user could similarly check box 212 if the user desired first class mail processing. The user could check box 214 to indicate certified mail processing and box 216 to indicate registered mail processing. The system could identify any class selection incompatibilities and notify the user. The user could then be allowed to check a portion of the box 217 to unselect a particular choice.

The Return Address box 230 allows a user to provide identification information and also provide the function of a return address in letting the postal authority know where to return undeliverable mail. The return address could be utilized with the biometric data. For example, a company may have an account linked to a return address that may be accessed by two or more users having a digital pen 10. Each user would have identifying biometric information on file. Accordingly, the Return address could be used for account selection and the biometric data used for sub-account selection and authorization.

The mail piece identification box 220 allows a user to provide a handwritten mail piece identification code. In this embodiment, the mail piece identification code is an alphanumeric code selected by the user. In alternative embodiments other symbols may be utilized and the code may be entirely or partially provided by an external processor. For example, the envelopes can be pre-printed with a dashed outline font of a mail piece identifier that the user will trace. Accordingly, the mail piece identifier can be pre-printed with a batch of numbers that are unique to the entire population or in groups that are unique to the user. When the batches are unique to a user or group of users, the digital pen can be used to distinguish the users or groups of users. In another alternative, the AS 70 may provide a unique mail piece ID to the user through a cellular telephone display or other display such as a display on the digital pen. The cellular telephone can be used to enhance security by having the AS 70 system require the input of a PIN before the MPID is sent.

As shown above, the user selects a class of service and thereby authorizes the postal authority 60 to receive payment from a postage account such as an account with the trusted third party at the data center 70. The postal authority determines the correct postage based upon criteria such as weight, dimensions and class of service. The postal authority then debits the funds from the user before processing the mailpiece and appropriate messages are transferred between the postal authority 60 and the data center 70.

In an alternative embodiment, a postal value field box 260 is provided that also utilizes the Anoto pattern 218. A user will handwrite a postal value using the digital pen of system 1. The system may then automatically debit the postal value written with the pen from the user postal value vault because the pen can recognize that the user is writing in the postal value box 260. In another alternative, the postal value is only debited from the user account when the mailpiece is processed by the postal authority.

In another embodiment, the pattern is used to define an envelope having a set of dimensions and a maximum weight. Accordingly, when the user fills in the envelope, the mailpiece is rated and the postage deducted from the user postage account before being deposited with the postal service.

In an alternative embodiment, another defined area for data input 260 is provided for entering a postage value. In such an embodiment, the pen 10 is used to write the postage amount applied to a mail piece. The pen infrastructure determines the value written and deducts the amount from the postage vault of the user. The postage vault may be located in the pen 10, in a co-located processor, or in a remote location in a remote vault processor. Postage vault systems are known. Here, the pen uses the pattern 218 to recognize that the user is entering a postage amount. The pen 10 recognizes the postage amount and processes the account debit to account for postage that is metered by the pen 10. If the users account did not have sufficient funds, an error condition can be communicated to the user by beeping sounds or other communication means and the mailpiece record can be invalidated.

In another alternative, a mailpiece that is determined to be under-postage can be processed. In one alternative, each registered pen meter user has a profile that determines whether the postal authority is authorized to charge the additional postage automatically and then continue to process the mailpiece. In an alternative, the postal authority may send a message to the user requesting such authorization.

In an alternative used to ensure that duplicate mailpiece identification codes are not used, a timestamp and pen meter identifier is appended to the written mailpiece identification. Here, the trusted third party (or the postal authority if a trusted third party is not used) knows if a user used the same mailpiece identification on more than one envelope. The trusted third party could determine if two mailpieces with the same mailpiece id could be co-pending. If not, there is no ambiguity. If there is ambiguity, the postal authority could be informed of the duplication. Since the postal authority cannot read the additional time information from the face of the mailpiece, the postal authority can attempt to determine whether the two mailpieces could possibly have overlapped. If so, the two mailpieces could be rejected, or they could be processed in the order received and the trusted third party could cancel the e-receipt according to the order in which the mail pieces are received.

In another embodiment, a unique identification code could be generated at the data center 70 or postal authority 60 and communicated to the user so that the user could write the code on the envelope.

In an alternative embodiment, a digital pen using position sensors similar to those used in a graphics drawing tablet is utilized. In this alternative, the media is defined as a template based upon position. The template could be stenciled on to the media such as a label or envelope in order to aid the user in proper placement of the data. The processor that is processing the data input into the template could offer a user a template selection to choose from, each with its own data location template definition. In another alternative, the template form identifier is placed in machine or human readable form on the media. The digital pen is then used to read the form identifier using a scanning technique or by the user tracing over the form number.

In another alternative embodiment, other biometric data may be utilized. For example, the digital pen 10 may be paired with an external processor such as a PDA such that a shared secret is provided to the pen 10 and the PDA 50. In one alternative, the user does not type in a device PIN for pairing, but a central data system uses unique identifiers such as MAC codes to pair devices. Thereafter, the PDA could also be used to capture biometric data related to a user.

Referring to FIG. 1 and FIG. 2, the system and method of this embodiment provides postage accounting and evidencing solutions. The digital pen 10 is used to handwrite the indicia on an envelope 270 that contains embedded intelligence 218. This indicia consists of the handwritten name, NRA 230 and any twelve randomly selected alphanumeric characters (MPID) 220 chosen by the sender (owner/user) of the pen. The handwritten information provides BIODATA that may be used to authenticate the sender. This BIODATA is sent to the AS 72 along with the PUID. The authentication process consists of comparing a newly computed Electronic Signature Card (ESC) with an ESC on file that was obtained during meter registration. If a match is found a tuple consisting of MPID and e-Receipt is stored in the system for future use. By using the ESC the system knows that the sender is legitimate, and the e-Receipt means that the sender paid for the postage.

The mail piece can now be dropped off in a Postal Office Mail Box or at any USPS Post Office location. When the mail piece is picked up, a postal employee can scan the NRA and the MPID data at the pickup point or at the post office, depending upon whichever location is more convenient. The NRA is used by the USPSVS to perform a quick verification to determine whether the account exists and is active. If the set of conditions are met the USPSVS 61 proceeds to compute an e-Receipt by hashing the MPID and the Electronic Signature Card that it has on file. To determine whether this mail piece was paid for the USPSVS 61 challenges the AS 72 by sending it the MPID for verification. The AS server 72 replies with the result of the challenge by using the MPID to retrieve the previously computed and stored e-Receipt along with any additional mail processing options such as registered mail or certified mail. If the two receipts match then the mail piece is allowed to proceed to its destination, otherwise it is returned to the sender. To complete this transaction the USPSVS 61 sends a transaction status to the AS server 72. At this point the AS server 72 can deactivate the particular e-Receipt and move to permanent storage for future use.

The AS server 72 uses the PUID 76 of the printer (pen 10), the sender's biometrics data (BIODATA) 73 and Mail Piece ID 74 to determine if the Electronic Signature card (ESC) on file matches a newly computed signature based on the data received from the printer. The sender is then notified about the transaction status. The information received is processed to compute and Electronic Receipt (e-Receipt) that this server 72 stores a long with the MPID 74 as tuple for faster retrieval later on. This server also receives Proof of Payment Requests (e-Receipt) from the USPS Verification Server (USPSVS) 61. The USPSVS 61 challenges the AS 72 server by only sending it the Mail Piece ID (MPID) 63. Since the AS 72 server has already computed this information, it simply retrieves the e-Receipt if one exists and forward it to the USPSVS 61 along with any mail processing options selected by the sender.

The USPSVS 61 receives as inputs the scanned Name/Return Address (NRA), and Mail Piece ID 63. It optionally stores and then uses the NRA to retrieve the sender's account information/status and performs a quick verification check on the account. If account exists and is active, then it sends a challenge to the AS 72 by supplying it with the MPID 63. AS 72 replies with an e-Receipt and any additional data such as mail processing options selected by the sender. The USPSVS 61 compares the two e-Receipts, if there is a match the mail piece is delivered to the intended recipient. Otherwise, it is rejected and sent back to the sender.

Figure 3:
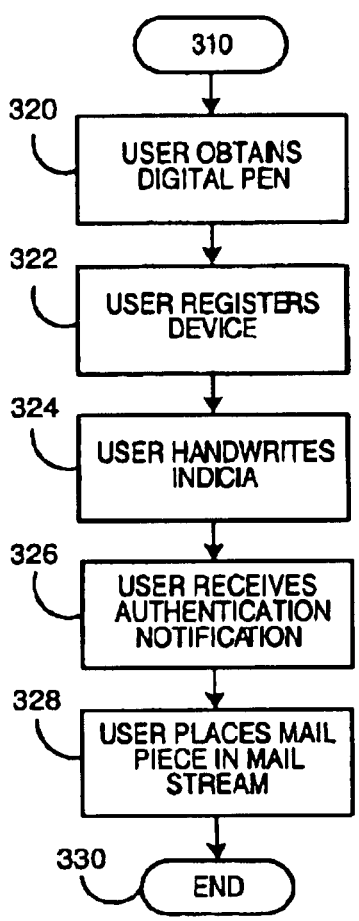
FIG. 3 is a flow chart showing a process for registering a digital pen and authenticating a user according to another illustrative embodiment of the present application.

Referring to FIG. 3, a method for creating the indicia is shown. The process 300 starts in step 310. In step 320, the user obtains a digital pen. In this embodiment, the digital pen is an Anoto digital pen, but other digital pens may be utilized in the system. In step 322, the user registers the device. In step 324, the user handwrites an indicia on a mail piece such as a letter envelope. In an alternative, a handwritten postage amount is written as a postage indicia that provides evidence of payment of postage. In step 326, the user receives authentication notification. In step 328, the user places the mail piece in the mail stream.

In step 322, the user is authenticated using a customer number and password. Alternatively, the user could be authenticated using biometrics and the pen could be authenticated using its unique Bluetooth 48 bit MAC address.

Alternatively, a user is provided information needed to pair a pen with a PDA. The shared secrets are set to time out and require periodic authentication such as every day or after a period of inactivity such as one hour, or after the handheld device is removed from the Personal Area Network area.

The digital pen 10 is a generic device. Accordingly, not all pens 10 are registered with the postal authority for use as a postage meter. In order to activate the metering function of the pen, it has to be registered with the postal authority (USPS). Additionally, a single pen might be used for several funds accounting systems.

Figure 4:
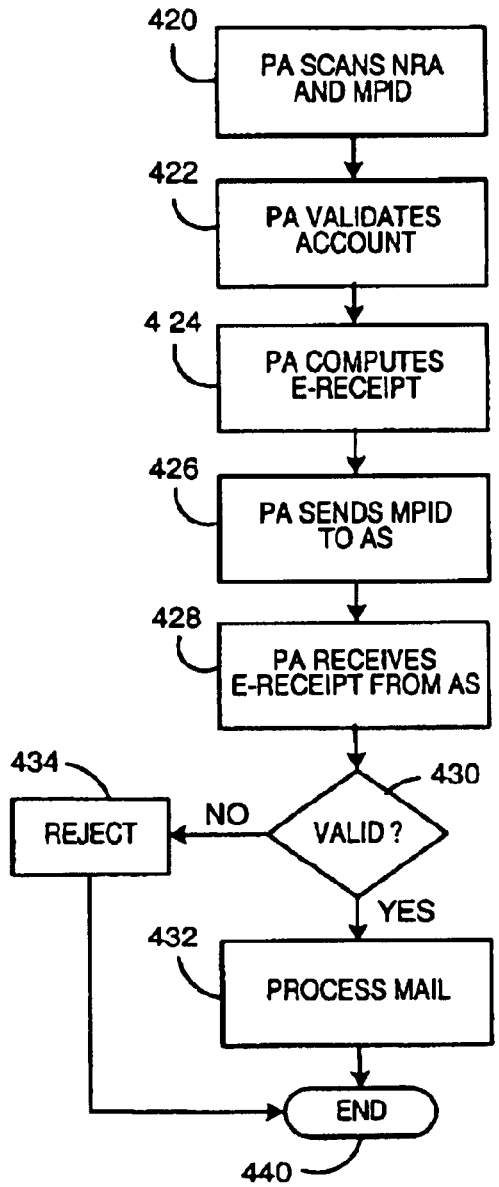
FIG. 4 is a flow chart showing a process for verifying payment of postage according to another illustrative embodiment of the present application.

Referring to FIG. 4, the process of validating a mail piece is described. The process 400 begins in step 410. In step 420, the Postal Authority scans or inputs the NRA and MPID for the mail piece. In step 422, the postal authority validates the account using the NRA. In step 424, the postal authority computes the e-receipt. In step 426, the postal authority challenges the authentication server by sending the MPID to the Authentication Server. In step 428, the postal authority receives the requested e-receipt from the authentication server. In step 430, the postal authority compares the e-receipts and possibly other data to determine if the mail piece is valid. If it is, the process proceeds to step 432 to process the mail. If not, the mail is rejected in step 434. If the mail is rejected, it could be returned to sender, processed for fraud investigation, or processed as a request for payment from the sender. The process then ends in step 440.

Figure 5:
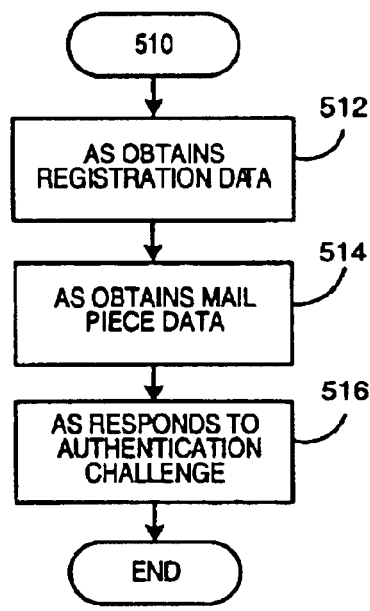
FIG. 5 is a flow chart showing a process for providing information to a postal authority for verifying payment of postage according to another illustrative embodiment of the present application.

Referring to FIG. 5, an illustrative embodiment of the present application is described. The authentication server processes data to assist the postal authority in making a postage verification determination. The process 500 starts in step 510 and proceeds to step 512.

A commercially available Anoto™ technology based pen is obtained at a store or at the Post Office. The pen is then registered either at the point of sale or later on at the convenience for the owner. The registration process can be carried out at any location that is set up to do that. The registration process consists of opening up an account with the USPS where PUID, NRA, billing info and an Electronic Signature Card (ESD) are generated and recorded. The registered owner or user fills out a form in his/her own handwriting on a pad that is pre-printed with an Anoto pattern. This process enables certain biometric data to be captured. This BIODATA represents particular characteristics of the registrant's manner of writing, such as pen tip pressure, and velocity and angle of inclination between the paper and the pen as it is held in writing position. These characteristics may be difficult for an imposter to imitate. Using a hash function, the BIODATA as well as the PUID are used to create a unique Electronic Signature Card (ESC) that is stored at the USPSVS as well as replicated on the AS server.

In step 512, the authentication server receives registration data.

The envelope or label pad is printed with a meter-authority licensed unique portion of the Anoto™ pattern. The pen sends this pattern along with the other information to the USPS server that recognizes the pattern as a licensed-Anoto™ pattern and processes it accordingly. Once the pen is registered it can be used as "postage metering device". The preferred way would be to use the pen connected wirelessly to a cell phone that provides Internet connectivity. The sender would write his/her Name/Return Address in his/her natural handwriting on an envelope preprinted with the licensed pattern. The user would additionally use a 12-character randomly picked alphanumeric character string to represent the MPID. The pattern would be printed on the Upper Left Hand Corner (ULC) of the envelope in the general area where return addresses are traditionally written. The sender would then check off any special mail processing options as well s a checkbox that indicates that the pen is being used as "postage meter". This last step triggers the pen to encrypt the BIODATA, the PUID, the PUID, as well as any selected options and transmit securely to the AS server for processing. The AS receives this information and proceeds to authenticate the sender by computing a temporary ESC that it compares with the ESC on file that was obtained during the registration process. If there is a match the server generates an e-Receipt and stores it along with the MPID for future use. A notification is transmitted to the sender as to the status of the transaction.

Now the mail piece is ready to be mailed by the sender. The sender drops it in a post office mailbox or brings it to a local post office. When the mail piece is picked up by the postal worker its NRA and MPID are scanned either are the pickup point or at the post office. The NRA is used by the USPSVS to perform a quick account status check. If account exists and is active, then USPSVS computes an e-Receipt for this transaction and sends a proof of payment verification challenge message to the AS. The only data included in that message is the MPID. The AS will use this MPID to retrieve its previously computed e-Receipt and sends it to the USPSVS as well as any special mail processing options that the sender selected. If the two receipts match then the mail piece is allowed to proceed to its destination otherwise it is rejected. A transaction status message is sent to the AS server. If the transaction was successful the sender's Meter Data Center account is debited accordingly. The transaction is then removed from the list of active transactions to be stored in a central database for evidence.

In step 514, the AS obtains mail piece data. In step 516, the AS responds to a challenge by the postal authority. Thereafter, the postal authority may instruct the AS to halt an account or disable a pen if fraud is detected.

Figure 6:
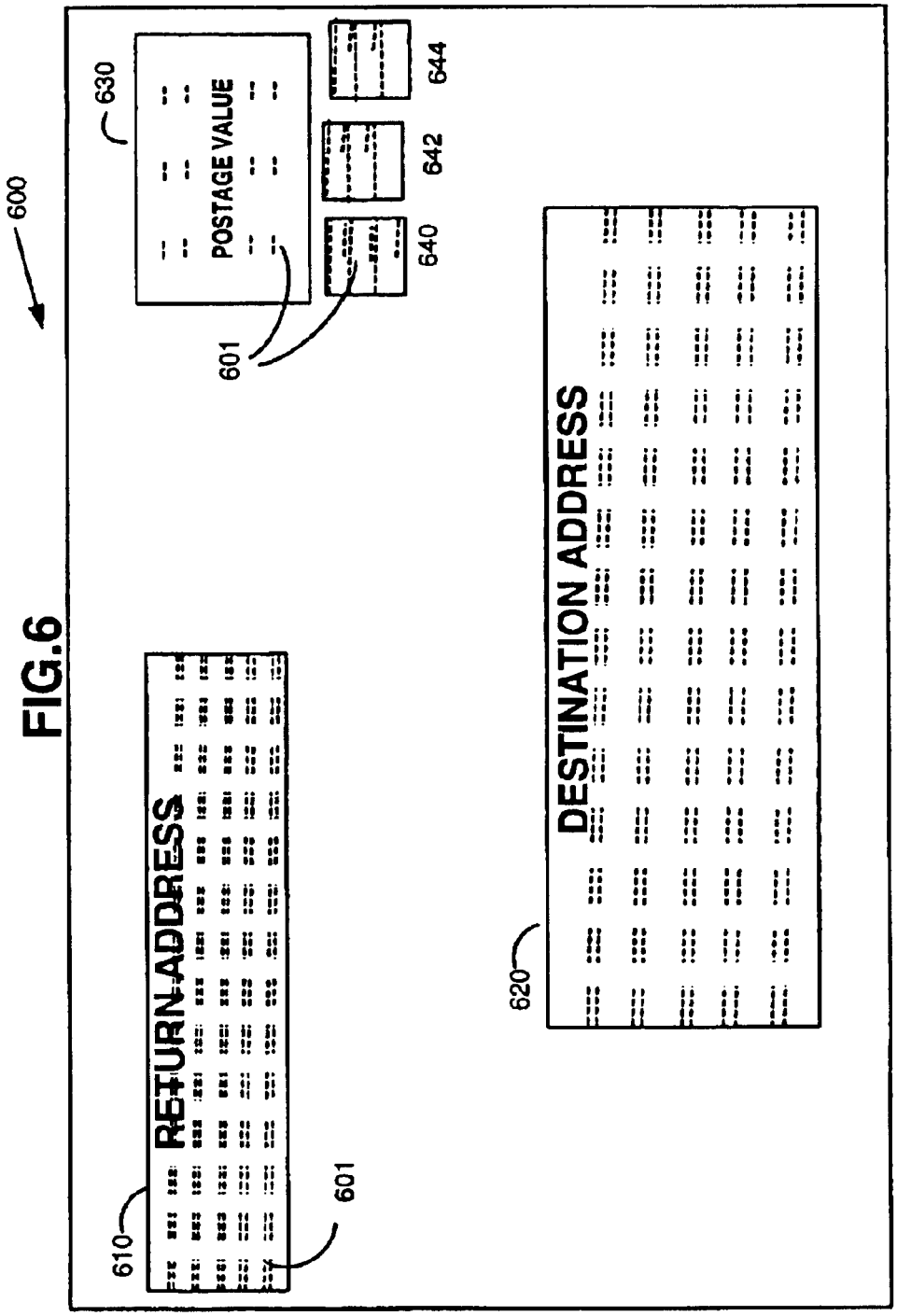
FIG. 6 is a schematic representation of a portion of a media for evidencing postage payment according to another illustrative embodiment of the present application.

Referring to FIG. 6, another embodiment of the present application is described. An envelope 600 includes a return address box 610 that may be labeled as a return address box. A destination address box 620 is included that may be labeled as a destination address box. A postal value box 630 is included and may be labeled a postal value box. Service boxes 640, 642 and 644 are included to allow the user to specify a particular service such as first class mail, certified mail or return receipt mail. The boxes include an Anoto Pattern 601 that enables the system to identify the boxes being written on by a user. In this embodiment, a written character mail piece identifier is not used. The destination address entered by the user with the digital pen is stored in digital form. The digital form is preferably a non-lossy compressed graphic file such as a Tiff file. The TIFF file is then used as the mail piece identifier by the system 1. When the postal authority receives the mail piece, the destination address area is scanned and a checksum or other best-fit technique is used to match the scan to the mail piece identifier record previously stored when the pen was used to create the envelope. The time of day and date may be used to focus a best-fit search of the image records that comprise the Mail Piece ID images. Image matching algorithms are known and are not described here in detail.

Alternatively, the return address, destination address, postage boxes are outlined and not marked with an identifier. In another alternative, the return address and destination address boxes are not outlined or named.

As can be appreciated, many alternative embodiments are possible. Many users can use the system. Additionally, multiple types of digital pens may be used and may be able to provide different biometric data. A single pen may be registered to a group of users and a single user may be cross-registered to use more than one pen. In another alternative, the system includes more than one Meter Data Center and/or postal authorities. In another alternative, the postal authority issues a mail piece identifier.

A method and system for processing mail is described. In one configuration a co-located external processor and a digital pen negotiate a communications connection to provide data used to facilitate payment of postage and to verify payment of postage. A system for a wireless mailroom having a gateway server to allow remote access is described in commonly owned U.S. patent application Ser. No. 10/021,583, filed Oct. 29, 2001 and incorporated herein by reference in its entirety. A digital pen utilized in embodiments of the present application may include a Bluetooth or other wireless transceiver paired to a processor such as a cellular telephone, PDA or notebook computer for dividing the processing the input/output, security, accounting and data capture functions of the systems described herein.

For example, a Bluetooth™ Personal Area Network is used to link a digital pen such as those utilized by Anoto Inc. of Waltham Mass. to a PDA that is then linked to a LAN or WAN for security, authentication and non-repudiation functions. The embodiments of the present application utilize a network system and it is to be understood that segments or all of local networks described in the embodiments could be assigned individual global addresses. However, it is also possible that one or more gateways or proxy servers could be utilized so that a sub-network of many devices appears at a single address for each gateway from the perspective of a device on the network higher up the hierarchy chain.

In an alternative applicable to any of the embodiment, the external user interface for password and authentication uses may be resident in a linked co-located external processor such as a PDA. Here, the external processor or PDA may allow customization of the mailing interface such as preferences for each mail piece in a batch. Alternatively, the user may check characters printed on the pattern such as alphanumeric characters in a sequence to build a password. The pen 10 can discern when each check was placed and where it was placed in order to ensure that the proper sequence was entered.

In an alternative applicable to any of the embodiment, the postal authority may verify postage payment without obtaining user profile information.

An alternative applicable to any of the embodiment is now described. The postal authority may perform address cleansing on the image receipt and then being ready to apply the cleansed address to a received mail piece (envelope) at induction to postal authority. For example, if a user fills out an address and transposes the zip code, the mail piece may be considered valid according to the third party (AS 70) but it is in fact addressed incorrectly. In such a situation, the postal authority on receipt of the image even before the mail piece gets to the postal authority could cleanse the address. When the mail piece arrives, the postal authority could apply a barcode or sticker to the mail piece in order to correct the address and then process it in the normal mail stream.

For example, the external processor could provide accounting system features that are typically provided by another accounting processor that is attached to a mailing machine. In another alternative, the system utilizes SyncML over Bluetooth™ to ensure that the most recent or an acceptable version of the particular user interface, logic code and security code loaded in the portable computer and the digital pen.

In another alternative applicable to any of the embodiments, Wi-Fi enabled wireless systems are utilized and the external processor comprises a Wi-Fi capable handheld pocket PC such as the Toshiba e740 Pocket PC. Furthermore, differing types of processors and logic systems may be supported. For example, JAVA based PALM OS devices may be utilized. The mailpiece logic, processing logic, security logic, user interface logic, communications logic and other logic could be provided in JAVA format or in a format compatible with individual platforms such as Windows CE and PALM OS. Similarly, other portable computing devices such as laptop computers and tablet computers and wireless capable computers could be utilized. Other platforms such as those using Symbian OS or OS-9 based portable processors could be utilized.

In another alternative applicable to any of the embodiments, the indicia creating device utilizes machine readable marking processes rather than human readable marking processes.

In another alternative applicable to any of the embodiments, the indicia creating device includes a wireless, substrate-marking device that includes a token controller having a secure token key storage device such as an iButton® available from Dallas Semiconductor in which an attack, for example, a physical attack on the device, results in an erasure of the key information. Passwords may be used, such as a password to access the device. In an alternative, the password may include biometric data read from a user. Alternatively, other secret key or public key systems may be utilized. Many key exchange mechanisms could be utilized such as the Diffe-Hellman key exchange protocol, Oakley exchange protocol, IKE (The Internet Key Exchange protocol), ISAKMP or other proprietary methods. Additionally, authentication and repudiation systems such as a secure hash including SHA-1 could be utilized in conjunction with a public-private key system.

The present application describes illustrative embodiments of a system and method for providing funds accounting and evidence of funds accounting using a wireless substrate-marking device. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A method for a user for authorizing and providing evidence of payment of postage for a mail piece comprising:
   obtaining a registered digital pen meter registered to the user, wherein the digital pen meter has been registered with a postal authority;
   handwriting a return address field on a mail piece;
   handwriting a destination address field on a mail piece;
   handwriting a mall piece identifier on the mail piece;
   handwriting a postage value field on the mail piece;
   then facilitating the transfer of digital pen data to a server by selecting a class of service by selecting a class of service box on the mail piece; and
   then placing the mail piece in the mail stream, wherein an account of the user is debited after the postal value field is handwritten on the mail piece.

2. The method at claim 1 further comprising:
   obtaining biometric data relating to the pen strokes of the user.

3. The method of claim 1 further comprising:
   obtaining a postage value indicator written in a postal value field.

4. The method of claim 1 wherein:
   the mail piece identifier comprises data obtained from a destination address field.

5. The method of claim 4 wherein:
   the mail piece identifier comprises a graphical image representation of the destination address field.

6. The method of claim 4 wherein:
   the mail piece identifier comprises data obtained from at least one pen stroke captured from writing on the mail piece.

7. The method of claim 4 wherein:
   the mail piece identifier comprises pen stroke data captured from the destination address field and is stored to be matched with a scan of the destination address field.

8. The method of claim 1 wherein:

the digital pen data comprises an electronic signature card.

9. The method of claim 8 wherein:

the electronic signature card includes a secure hash that includes data from the return address field.

10. The method of claim 1 further comprising:

selecting a class of service using the digital pen meter.

11. The method of claim 1 further comprising:

providing account selection data by handwriting the return address field.

12. A method for verifying payment of postage for a mail piece processed in a mail stream comprising:

obtaining digital pen data from a user for authorizing payment of postage wherein the digital pen data includes a mail piece identifier;

creating a modified mail piece identifier using the mail piece identifier and modification data associated with the postage payment authorization;

creating a reference user profile using the modified mail piece identifier;

storing the reference user profile and associated the reference user profile with a user identifier, the modified mail piece identifier and the mail piece identifier;

obtaining a processed mail piece identifier from the mail piece;

obtaining customer data from the mail piece and determining a mail piece user identifier using the customer data;

determining a mail piece user profile for the mail piece using the processed mail identifier and the mail piece user identifier;

comparing the mail piece user profile to the user profile; and verifying payment of postage using the comparison result.

13. The method of claim 12 wherein:

the modification data includes time stamp information associated with the postage authorization request.

14. The method of claim 12 wherein:

the modification data is selected from the group consisting of user biometric data, user identifier, digital pen meter identifier and a time stamp associated with the postage payment authorization.

15. The method of claim 12 wherein:

the modification data includes the user identifier.

16. The method of claim 12 further comprising:

storing a mail piece processed record for the mail piece including the mail piece identifier and the user identifier;

processing at least one additional mail piece to determine a second mail piece processed record including a second mail piece identifier and a second user identifier; and comparing the mail piece processed record and the second mail piece processed record.

17. A method for verifying payment of postage comprising:

obtaining a mail piece identification image from a user as the user writes a destination address with a digital pen, wherein the digital pen is associated with a digital pen identifier that is associated with a user identifier;

storing the mail piece identification image in a record associated with the use, wherein the record is stored in a database having a plurality of records;

obtaining a processed mail piece identification image from a processed mail piece;

searching the database using the processed mail piece identification image using an image best fit search; and verifying pavement of postage using the database search result.

18. The method of claim 17 wherein:

the mail piece identification image is associated with the user using the user identifier.

19. The method of claim 17 wherein:

the mail piece identification image is associated with the user using the digital pen identifier.

20. The method of claim 17 further comprising:

associating the mail piece identification image with a time stamp;

associating the processed mail piece identification image with a processed image time stamp; and comparing the time stamp with the processed image time stamp.

* * * * *